(12) United States Patent
Savidge et al.

(10) Patent No.: US 11,639,615 B2
(45) Date of Patent: May 2, 2023

(54) EXTERIOR HANDLE POSITION INDICATOR FOR AIRCRAFT ESCAPE HATCH

(71) Applicant: BOMBARDIER INC., Dorval (CA)

(72) Inventors: John Richard Savidge, Sooke (CA); Christopher Gardere, Candiac (CA); Jean-Philippe Demers, Verdun (CA); David Riviere, Laval (CA); Remi Crozier, Montreal (CA); Goran Kalaba, Montréal (CA); Patrick Serres, Montréal (CA)

(73) Assignee: BOMBARDIER INC., Dorval (CA)

( * ) Notice: Subject to any disclaimer, the term of this patent is extended or adjusted under 35 U.S.C. 154(b) by 478 days.

(21) Appl. No.: 16/704,491

(22) Filed: Dec. 5, 2019

(65) Prior Publication Data

US 2020/0181943 A1    Jun. 11, 2020

Related U.S. Application Data

(60) Provisional application No. 62/776,754, filed on Dec. 7, 2018.

(51) Int. Cl.
| | |
|---|---|
| *E05B 41/00* | (2006.01) |
| *B64C 1/14* | (2006.01) |
| *B64D 25/08* | (2006.01) |
| *E05B 1/00* | (2006.01) |
| *E05B 85/10* | (2014.01) |
| *E05B 85/12* | (2014.01) |

(52) U.S. Cl.
CPC ............ *E05B 41/00* (2013.01); *B64C 1/1407* (2013.01); *B64D 25/08* (2013.01); *E05B 1/003* (2013.01); *E05B 85/103* (2013.01); *E05B 85/107* (2013.01); *E05B 85/12* (2013.01)

(58) Field of Classification Search
CPC .......... E05B 41/00; E05B 1/003; E05B 85/10; E05B 85/103; E05B 85/107; E05B 85/12; E05B 5/00; E05B 5/003; E05B 5/006; E05B 1/0084; B64C 1/1407; B64C 1/14; B64C 1/1423; B64C 1/143; B64D 25/08; Y10T 292/57; Y10S 292/31
See application file for complete search history.

(56) References Cited

U.S. PATENT DOCUMENTS

| | | |
|---|---|---|
| 3,336,775 A | 8/1967 | Russell et al. |
| 6,059,231 A | 5/2000 | Dessenberger, Jr. |
| 6,454,210 B1 | 9/2002 | Plattner |
| 7,552,954 B2 * | 6/2009 | Rozo ...................... E05B 41/00 |
| | | 292/DIG. 31 |

(Continued)

*Primary Examiner* — Christine M Mills
*Assistant Examiner* — Yahya Sidky
(74) *Attorney, Agent, or Firm* — Norton Rose Fulbright Canada LLP

(57) ABSTRACT

An escape hatch for an aircraft includes a door body having an exterior side and an interior side opposite the exterior side; an exterior handle movably connected to the door body, the exterior handle rotatable between a stowed position, in which the exterior handle is recessed within an opening of the door body, and an unstowed position, the exterior handle being accessible from the exterior side of the door body to open the door; and a visual indicator connected to the door body and visible from the interior side of the door body only when the exterior handle is in the stowed position.

12 Claims, 5 Drawing Sheets

(56) References Cited

U.S. PATENT DOCUMENTS

| | | | |
|---|---|---|---|
| 2003/0213095 A1* | 11/2003 | Jackson | B64C 1/1407 16/110.1 |
| 2017/0009500 A1* | 1/2017 | Do | E05B 5/003 |

* cited by examiner

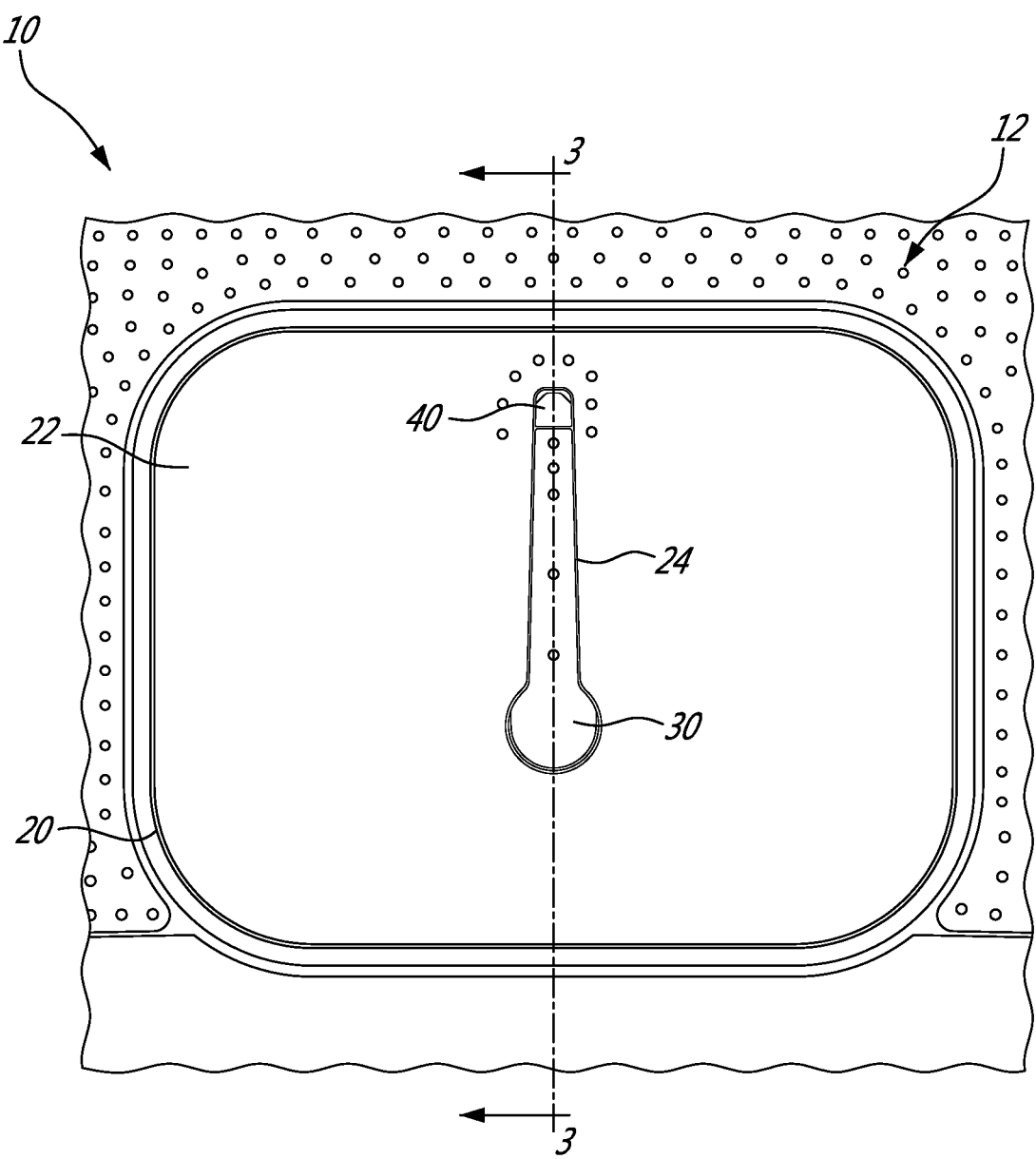

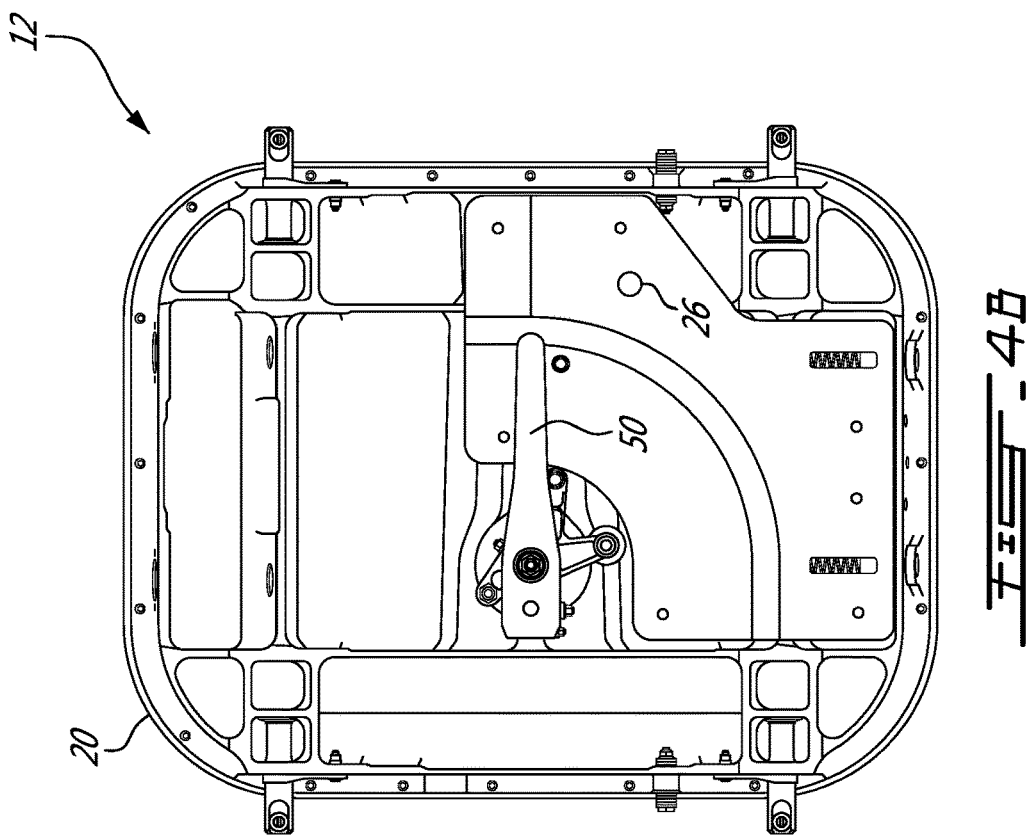
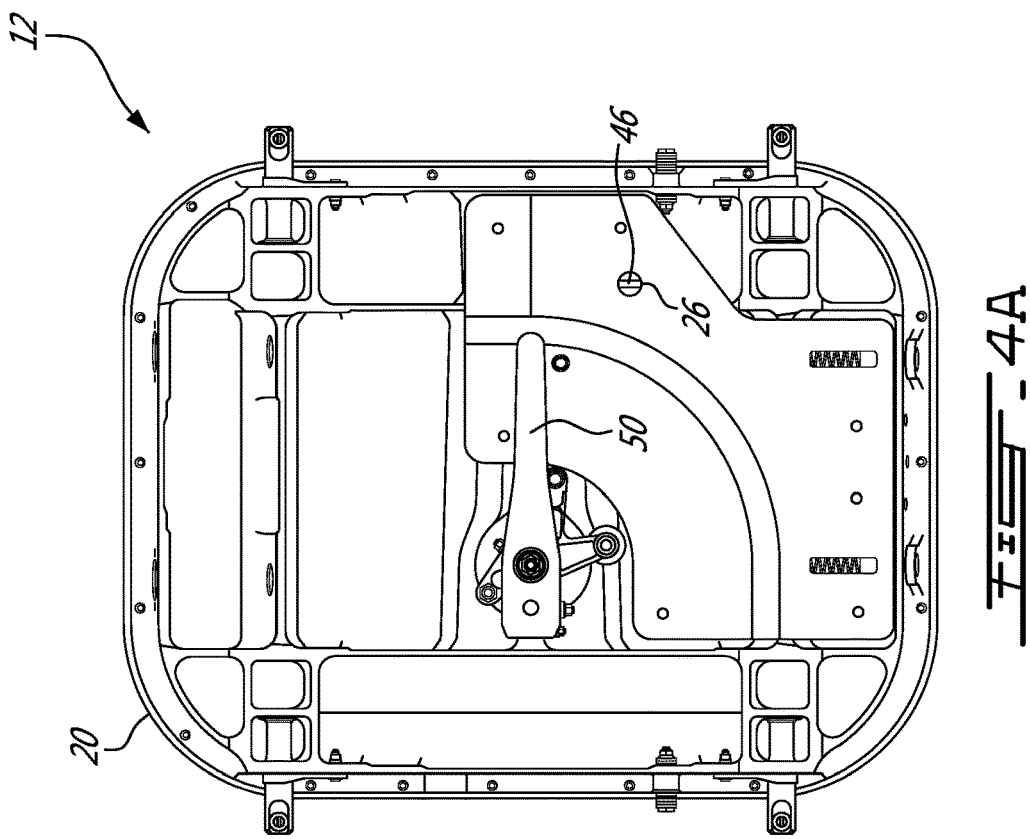

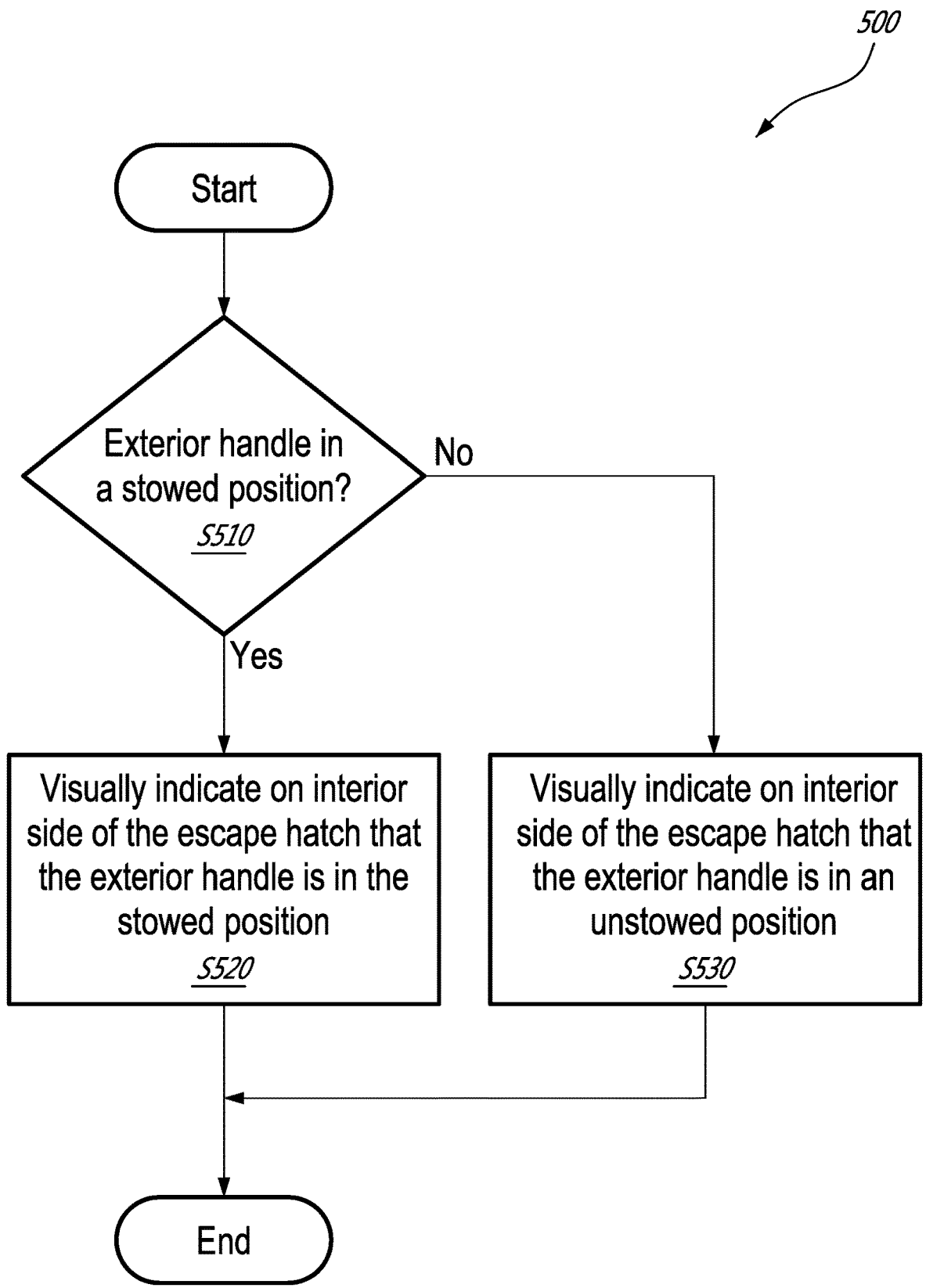

EXTERIOR HANDLE POSITION INDICATOR FOR AIRCRAFT ESCAPE HATCH

CROSS-REFERENCE TO RELATED APPLICATION AND CLAIM OF PRIORITY

The present application claims priority from U.S. Provisional Patent Application No. 62/776,754 filed on Dec. 7, 2018, the entire contents of which are incorporated by reference herein.

FIELD

This relates generally to mobile platforms such as aircraft, and in particular, to detecting a position of an exterior handle of an escape hatch of an aircraft.

BACKGROUND

Some aircraft may have an escape hatch in a cockpit that can be opened from both the interior and exterior of the aircraft. For example, an interior handle may function to open and close the escape hatch from the interior of the aircraft, and an exterior handle may function to open the escape hatch from the exterior of the aircraft. However, when such an escape hatch is closed and latched from the interior of the aircraft, the exterior handle can remain in an unstowed configuration and extend into the airflow and consequently increase drag when the aircraft is in flight. Improvement is desirable.

SUMMARY

According to an aspect, there is provided an escape hatch for an aircraft, comprising: a door body having an exterior side and an interior side opposite the exterior side; an exterior handle movably connected to the door body, the exterior handle rotatable between a stowed position, in which the exterior handle is recessed within an opening of the door body, and an unstowed position, the exterior handle being accessible from the exterior side of the door body to open the door; and a visual indicator connected to the door body and visible from the interior side of the door body only when the exterior handle is in the stowed position.

In some embodiments, the door body defines an aperture through which the visual indicator is visible from the interior side of the door body only when the exterior handle is in the stowed position.

In some embodiments, the visual indicator is selectively moveable between a retained position and an unretained position, the retained position to secure the exterior handle in the stowed position.

In some embodiments, the visual indicator is visible from the interior side of the door body only when in the retained position.

In some embodiments, the door body defines an aperture through which the latch is visible from the interior side of the door body only when the visual indicator is in the retained position.

In some embodiments, the visual indicator is biased toward the retaining position.

In some embodiments, the visual indicator is rotatably connected to the door body.

In some embodiments, the escape hatch may further comprise a biasing member biasing the visual indicator to rotate the visual indicator in a first rotational direction, about an axis, past the retained position, and when the exterior handle is in the stowed position the latch is prevented from rotating past the retained position to secure the exterior handle in the stowed position, and upon rotation of the visual indicator in a second rotational direction about the axis, opposite the first rotational direction, the exterior handle is movable to an unstowed position.

In some embodiments, the exterior handle is rotatably connected to the door body.

According to another aspect, there is provided an aircraft comprising an escape hatch as described herein.

According to another aspect, there is provided a door for an aircraft, comprising: a door body having an exterior side and an interior side opposite the exterior side; an exterior handle movably connected to the door body, the exterior handle rotatable between a stowed position, in which the exterior handle is recessed within an opening of the door body, and an unstowed position, the exterior handle being accessible from the exterior side of the door body to open the door; a hook connected to the door body and selectively moveable between a retained position and an unretained position, the retained position to secure the exterior handle in the stowed position; and a visual indicator mechanically coupled to the hook, wherein the visual indicator is visible from the interior side of the door body only when the hook is in the retained position.

In some embodiments, the door body defines an aperture through which the visual indicator is visible from the interior side of the door body only when the hook is in the retained position.

In some embodiments, the hook is biased toward the retained position.

In some embodiments, the hook is rotatably connected to the door body.

In some embodiments, the door may further comprise a biasing member biasing the hook to rotate the hook in a first rotational direction, about an axis, past the retained position, and when the exterior handle is in the stowed position the latch is prevented from rotating past the retained position to secure the exterior handle in the stowed position, and upon rotation of the hook in a second rotational direction about the axis, opposite the first rotational direction, the exterior handle is movable to an unstowed position.

In some embodiments, the visual indicator is rotatably fixed to the hook.

In some embodiments, the exterior handle is rotatably connected to the door body.

According to another aspect, there is provided an aircraft comprising a door as described herein.

According to another aspect, there is provided a method for operating an escape hatch for an aircraft, the escape hatch having an interior side, an exterior side opposite the interior side, and an exterior handle accessible from the exterior side to open the escape hatch, the method comprising: when the exterior handle is in a stowed position, in which the exterior handle is recessed within an opening of the escape hatch, visually indicating on the interior side of the escape hatch that the exterior handle is in the stowed position; and when the exterior handle is in an unstowed position, visually indicating on the interior side of the escape hatch that the exterior handle is in the unstowed position.

In some embodiments, the visually indicating on the interior side of the escape hatch that the exterior handle is in the stowed position comprises actuating a visual indicator to be visible from the interior side.

In some embodiments, the method may further comprise: when the exterior handle is secured in the stowed position by a hook, visually indicating on the interior side of the escape hatch that the exterior handle is secured in the stowed position by the hook.

In some embodiments, the hook rotates about an axis with a rotational bias to secure the exterior handle in the stowed position and the visual indicator is rotatably fixed to the hook.

Other features will become apparent from the drawings in conjunction with the following description.

BRIEF DESCRIPTION OF DRAWINGS

In the figures which illustrate example embodiments,

FIG. 2 is an enlarged top view of the door in the aircraft of FIG. 1;

FIG. 4A is a bottom view of the door of FIG. 3A, with an exterior handle in a stowed position and the visual indicator in a retained position, from an interior side;

FIG. 4B is a bottom view of the door of FIG. 3C, with the exterior handle in an unstowed position and the visual indicator in an over-travel position, from an interior side; and FIG. 5 is a flowchart of a method for operating an escape hatch for an aircraft, according to an embodiment.

DETAILED DESCRIPTION

An escape hatch may be present in the ceiling of a cockpit of an aircraft and may be used, in an example, to permit the flight crew to exit the aircraft in an emergency situation. In various embodiments, the escape hatch and associated methods described herein may facilitate the flight crew's detection of a position of an exterior handle of the escape hatch when the escape hatch is closed, in particular, whether the exterior handle is stowed within a recess of the escape hatch, or unstowed.

For example, an escape hatch may have both an exterior handle and an interior handle. The interior handle may allow the escape hatch to be opened and closed from an interior side. The exterior handle may allow, from an exterior side, the escape hatch to be opened.

The exterior handle and interior handle may be engaged by way of a one-way clutch. As such, in operation, as the interior handle rotates to open the escape hatch, the exterior handle does not rotate, and as the exterior handle rotates to open the escape hatch, the interior handle rotates correspondingly. In such a simplified clutch mechanism, the exterior handle may not stow automatically when the escape hatch is closed by the interior handle. As compared to traditional escape hatches, such a simplified clutch mechanism may also allow for the thickness of the escape hatch to be reduced, for example, to approximately four inches.

Stowing the exterior handle within the escape hatch may improve aerodynamics of the aircraft. Stowage of the exterior handle may also reduce the likelihood of the exterior handle opening the door by contact with an object or air pressure and/or air movement moving the exterior handle to open the door. Thus, when the exterior handle is stowed, the door may be more securely closed.

Visual indication of whether an exterior handle is stowed, for example, by way of visual indication of the position of a latch that latches the exterior handle into a stowed position, as disclosed herein, may allow for a visual indication of whether an exterior handle is stowed, as viewed from an interior side of the door, namely, the interior of the aircraft.

Such a visual indication may provide for cost and weight savings as it may allow for a use of a clutch between the exterior handle and an interior handle of the door that is cheaper and lighter as compared to other existing systems.

Although the disclosure herein primarily makes reference to a cockpit escape hatch in an aircraft, it will be understood that aspects of the present disclosure can equally apply to other doors of an aircraft, including, for example, passenger doors.

Similarly, even though the disclosure mainly makes reference to an aircraft door as an example, aspects of the present disclosure can equally apply to doors of other types of mobile platforms such as trains, buses, watercraft (e.g., ships), spacecraft, trucks and other vehicles. Aspects of various embodiments are described through reference to the drawings.

Figure 1:
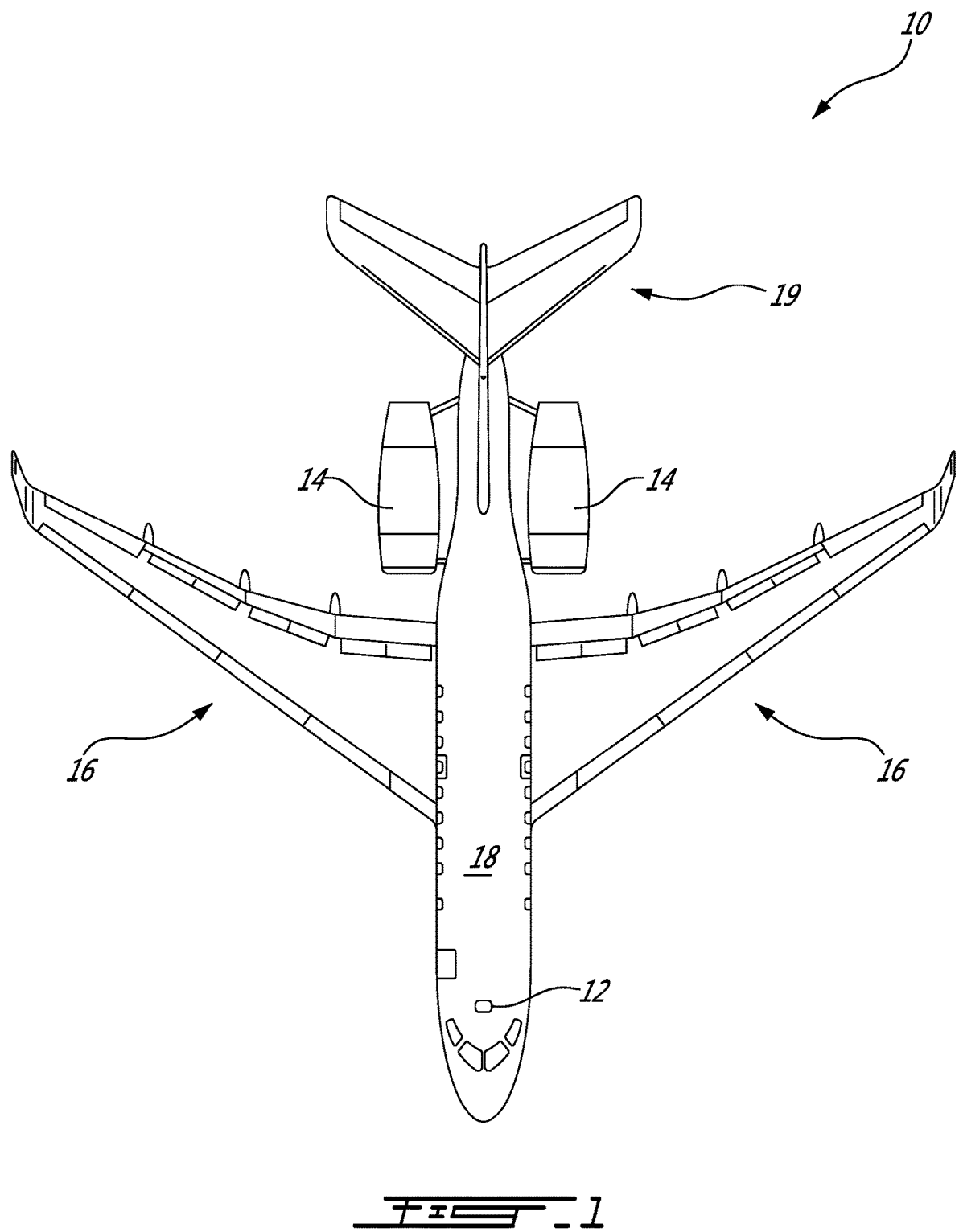
FIG. 1 is a top view of an aircraft having an escape hatch, in accordance with an embodiment.

FIG. 1 is a top plan view of an exemplary aircraft 10 which can comprise a door such as an escape hatch 12 from a cockpit, as described herein. Aircraft 10 can be a fixed-wing aircraft comprising one or more engines 14. Aircraft 10 can comprise wings 16, fuselage 18 and empennage 19. Aircraft 10 can be any type of aircraft such as corporate, private, commercial and passenger aircraft suitable for civil aviation. For example, aircraft 10 can be a (e.g., ultra-long range) business jet, a twin-engine turboprop airliner or a regional jet airliner.

Escape hatch 12 separates and forms a barrier between the interior of the aircraft 10 and its exterior environment. Accordingly, hatch 12 can be configured to withstand a pressure differential between the interior and exterior of aircraft 10 due to pressurization of the interior (e.g., passenger cabin and cockpit) of aircraft 10 during flight. Escape hatch 12 therefore defines an exterior side 11 on a first side of escape hatch 12, and an interior side 13 on a second side of escape hatch 12, as shown, for example, in FIG. 3A.

Figure 3A:
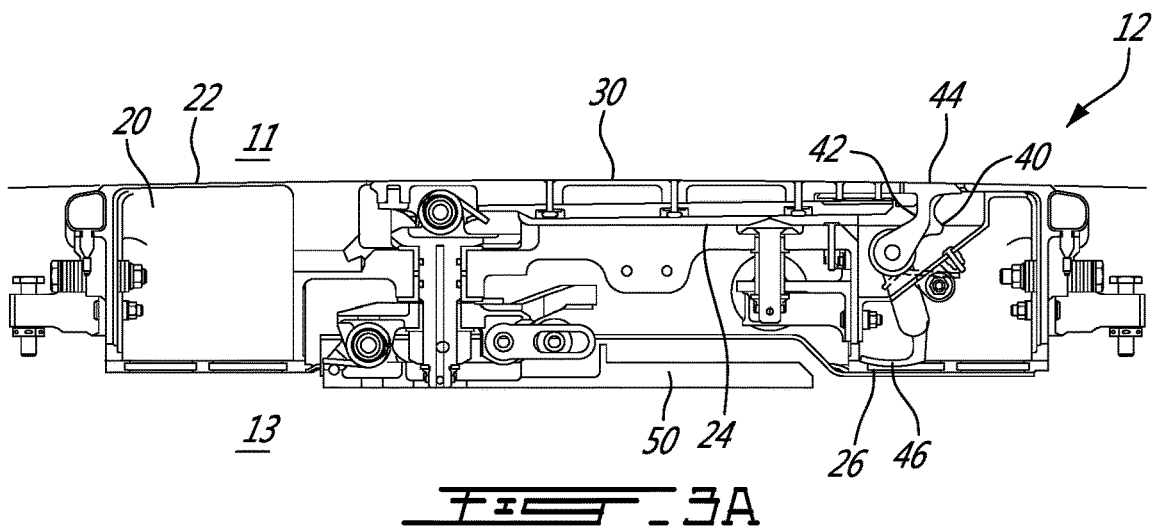
FIG. 3A is a cross-sectional view of the door of FIG. 2, along line 3-3, with an exterior handle in a stowed position and a visual indicator in a retained position.

FIG. 2 is an enlarged top view of escape hatch 12 from exterior side 11. FIG. 3A is a cross-sectional view of escape hatch 12 along line 3-3 of FIG. 2.

Escape hatch 12 has a door body 20 with an external surface 22. Door body 20 defines a recess 24 on external surface 22 open to exterior side 11. Recess 24 may be sized to receive an exterior handle 30, described in further detail below. Door body 20 further defines an aperture 26 open to interior side 13. Aperture 26 may be sized to provide a visual field of view into door body 20 from interior side 13.

Escape hatch 12 includes exterior handle 30 to open and close escape hatch 12 from exterior side 11, and an interior handle 50 to open and close escape hatch 12 from interior side 13. Exterior handle 30 may be movably or rotatably connected to door body 20, and rotatable between a stowed position and an unstowed position. In an unstowed position, exterior handle 30 may be further rotated, for example past 45 degrees rotation from a stowed position, to open escape hatch 12.

Exterior handle 30 is shown in a stowed position in FIG. 2, in which exterior handle 30 is disposed within recess 24. In some embodiments, in a stowed position, exterior handle 30 is flush with external surface 22 of escape hatch 12, for example, as shown in FIG. 3A.

Figure 3B:
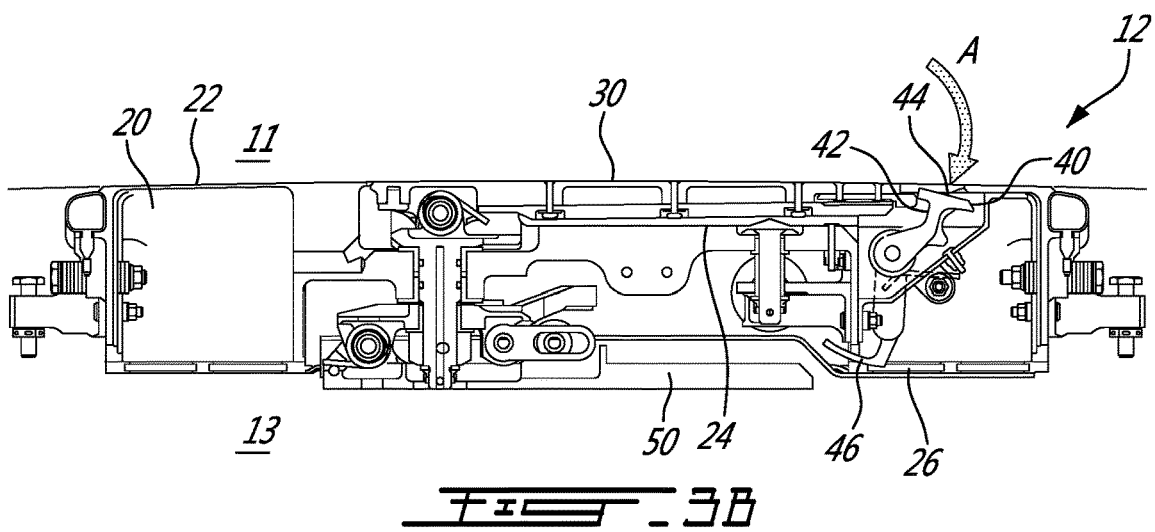
FIG. 3B is the cross-sectional view of the door of FIG. 3A, with the exterior handle in the stowed position and the visual indicator in an unretained position.
Figure 3C:
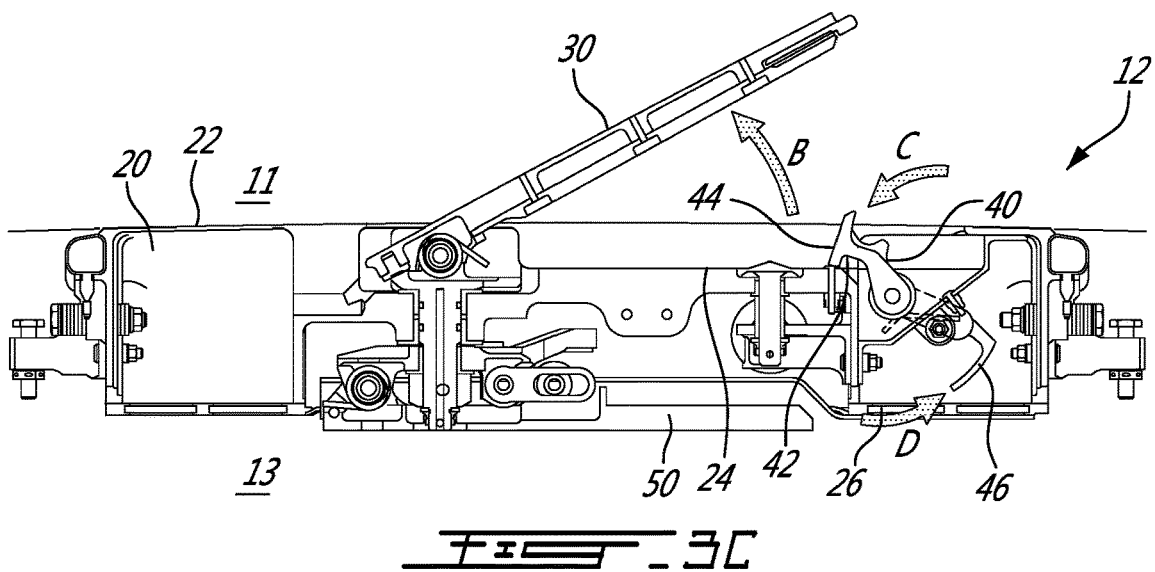
FIG. 3C is the cross-sectional view of the door of FIG. 3A, with the exterior handle in an unstowed position and the visual indicator in an over-travel position.

FIG. 3C illustrates exterior handle 30 in an unstowed position. In an unstowed position, exterior handle 30 is accessible from exterior side 11 to open escape hatch 12. In some embodiments, exterior handle 30 may be spring-loaded to bias to an unstowed position.

Escape hatch 12 also includes a visual indicator 40 rotatably connected to door body 20. Visual indicator 40 may include a hook mechanism, such as hook 42, that is spring loaded, and actuated by a pushbutton 44 which may also be spring-loaded. Hook 42 may physically engage with exterior handle 30 to restrain exterior handle 30 in a stowed position and prevent exterior handle 30 from rotating to an unstowed position.

As shown, for example, in FIG. 3A, pushbutton 44 is accessible at exterior side 11. Pushbutton 44 may be actuated by force applied by a user to remove the restraint of hook 42 from exterior handle 30, allowing exterior handle 30 to rotate out of a stowed position. Any other suitable actuation technique may be used to rotate visual indicator 40.

In some embodiments, visual indicator 40 includes a flag 46 that is mechanically coupled to hook 42. Flag 46 may be a color that is easily visible, such as yellow, and may be different in color from the color of external surface 22 or door body 20 of escape hatch 12 or other components of aircraft 10, to provide visibility of flag 46.

In some embodiments, flag 46 is rotatably fixed or fixedly attached to hook 42 and pushbutton 44, and thus visual indicator 40 may move as a single unit. In some embodiments, flag 46 may be movable in relation to hook 42 and/or pushbutton 44. In an example, hook 42 may be actuated to rotate in a clockwise direction (for example, to an unretained position) without moving flag 46, and the presence of a stopper between hook 42 and flag 46 would cause flag 46 to rotate and follow hook 42 as it rotates in a counter-clockwise direction (for example, to an over-travel position).

Visual indicator 40 may be rotatable, for example, by actuating pushbutton 44, between a retained position, an unretained position and an over-travel position, as described in further detail below.

FIGS. 3A to 3C illustrate visual indicator 40 in use, and the movement of exterior handle 30 from a stowed to unstowed position. FIG. 3A illustrates exterior handle 30 in a stowed position and visual indicator 40 in a retained position. FIG. 3B illustrates exterior handle 30 in the stowed position and visual indicator 40 in an unretained position. FIG. 3C illustrates exterior handle 30 in an unstowed position and visual indicator 40 in an over-travel position.

In use, exterior handle 30 may be disposed in a stowed position as shown in FIG. 3A, in which exterior handle 30 is disposed within recess 24 of door body 20.

In a retained position, for example, as shown in FIG. 3A, visual indicator 40 secures exterior handle 30 in a stowed position, by retaining exterior handle 30 with hook mechanism 42. As illustrated in FIG. 3A, hook mechanism 42 defines a surface that overlaps and contacts a portion (for example, a tab) of exterior handle 30 to retain exterior handle 30 in the stowed position.

As further shown in FIG. 3A, in a retained position, flag 46 is aligned with aperture 26 of door body 20, and is thus visible through aperture 26.

FIG. 4A is a bottom view of escape hatch 12 of FIG. 3A from interior side 13, with exterior handle 30 in a stowed position and visual indicator 40 in a retained position. As seen in FIG. 4A, in a retained position of visual indicator 40, corresponding to a stowed position of exterior handle 30, flag 46 of visual indicator 40 is visible through aperture 26 of door body 20.

As illustrated in FIG. 3B, visual indicator 40 may be actuated to rotate visual indicator 40 in a clockwise direction A, for example, by a user applying force to pushbutton 44. As visual indicator 40 rotates, flag 46 follows and similarly rotates. As shown in FIG. 3B, in an unretained position, flag 46 is not aligned with aperture 26 of door body 20, and is thus not visible through aperture 26.

Rotation of visual indicator 40 to an unretained position also allows exterior handle 30 to freely rotate from a stowed position to an unstowed position, for example, the unstowed position shown in FIG. 3C.

As illustrated in FIG. 3C, exterior handle 30 may be rotated from the stowed position to an unstowed position, in counter-clockwise direction B.

With exterior handle 30 in an unstowed position, visual indicator 40 may then be free to rotate in a counter-clockwise direction C, to an over-travel position shown in FIG. 3C. Visual indicator 40 may be biased by a biasing member to rotate in counter-clock-wise direction C, for example, may be spring-loaded, and thus may rotate in direction C upon release of force on pushbutton 44.

Visual indicator 40 may have a rotational bias to rotate in a first rotational (e.g., counter-clockwise) direction C, about an axis, past the retained position, and when exterior handle 30 is in the stowed position visual indicator 40 is prevented from rotating past the retained position, and will stop at the retained position. Upon rotation of visual indicator 40 in a second rotational direction (e.g. clockwise) direction A about the axis, opposite the first rotational direction, exterior handle 30 is movable to an unstowed position.

Visual indicator 40 may thus be biased to the retained position when exterior handle 30 is in a stowed position, and be biased to the over-travel position when exterior handle in an unstowed position.

As visual indicator 40 rotates, flag 46 follows and similarly rotates in counter-clockwise direction D to the over-travel position. As shown in FIG. 3C, in an over-travel position, flag 46 is not aligned with aperture 26 of door body 20, and is thus not visible through aperture 26.

FIG. 4B is a bottom view of escape hatch 12 of FIG. 3C, with exterior handle 30 in an unstowed position and visual indicator 40 in an over-travel position, from interior side 13. As seen in FIG. 4B, in an over-travel position of visual indicator 40, corresponding to an unstowed position of exterior handle 30, flag 46 of visual indicator 40 is not visible through aperture 26 of door body 20.

FIG. 5 is a flowchart of a method 500 for operating escape hatch 12. Method 500 may be used for providing a visual indication, by way of flag 46 of visual indicator 40, from interior side 13 to indicate that exterior handle 30 is in a stowed position.

At block S510, if exterior handle 30 is in a stowed position, control flow proceeds to block S520. Otherwise, control flow proceeds to block S530.

At block S520, a visual indication is provided on interior side 13 of escape hatch 12 that exterior handle 30 is in the stowed position. For example, flag 46 may be actuated to be visible from interior side 13 of escape hatch 12, for example, through aperture 26 in door body 20.

At block S530, a visual indication is provided on interior side 13 of escape hatch 12 that exterior handle 30 is in an unstowed position. For example, flag 46 may be actuated so as to not be visible from interior side 13 of escape hatch 12, for example, through aperture 26 in door body 20.

In use, a flight crew member may operate escape hatch 12 to stow exterior handle 30 in escape hatch 12. For example, the crew member, from exterior side 13 of aircraft 10, may rotate escape hatch 12 into a closed position in aircraft 10, thus closing off the cockpit. The crew member may then manually stow exterior handle 30 by pushing on pushbutton 44 of visual indicator 40, thus rotataing visual indicator 40 to an unretained position. Exterior handle 30 may then be disposed within recess 24 in a stowed position. Upon release of pushbutton 44, visual indicator 40 rotates to a retained position and secures exterior handle 30 in a stowed position by retaining exterior handle 30 with hook mechanism 42. In this retained position, flag 46 of visual indicator 40 is visible through aperture 26 of door body 20. If the crew member does not stow exterior handle 30 properly, visual indicator 40 may then be free to rotate to an over-travel position. In the over-travel position, flag 46 is not aligned with aperture 26 of door body 20, and is thus not visible through aperture 26.

Conveniently, visual indicator 40 may be visible from the interior side of the door body, for example, through aperture 26, only when visual indicator 40 is in a retained position, which may occur only when exterior handle 30 is stowed.

The above description is meant to be exemplary only, and one skilled in the relevant arts will recognize that changes may be made to the embodiments described without departing from the scope of the disclosure. The present disclosure may be embodied in other specific forms without departing from the subject matter of the claims. Also, one skilled in the relevant arts will appreciate that while the systems, devices and methods disclosed and shown herein may comprise a specific number of elements/steps, the systems, devices and methods could be modified to include additional or fewer of such elements/steps. The present disclosure is also intended to cover and embrace all suitable changes in technology. Modifications which fall within the scope of the present disclosure will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. An escape hatch for an aircraft, comprising:
    a door body having an exterior side and an interior side opposite the exterior side;
    an exterior handle movably connected to the door body, the exterior handle rotatable between a stowed position, in which the exterior handle is recessed within an opening of the door body, and an unstowed position, the exterior handle being accessible from the exterior side of the door body to open a door comprising the door body; and
    wherein the door body defines an aperture through which a visual indicator is connected to the door body and visible from the interior side of the door body only when the exterior handle is in the stowed position; and
    wherein any component of the visual indicator is not visible from the interior side of the door body when the exterior handle is in the unstowed position; and
    wherein the visual indicator is selectively moveable between a retained position and an unretained position, the retained position to secure the exterior handle in the stowed position; and
    wherein the doorbodydefinesa n a pertu re through which a latch is visible from the interior side of the door body only when the visual indicator is in the retained position, wherein the latch latches the exterior handle into the stowed position.

2. The escape hatch of claim 1, wherein the visual indicator is visible from the interior side of the door body only when in the retained position.

3. The escape hatch of claim 1, wherein the visual indicator is biased toward the retained position.

4. The escape hatch of claim 3, comprising a biasing member biasing the visual indicator to rotate the visual indicator in a first rotational direction, about an axis, past the retained position, and when the exterior handle is in the stowed position, the latch is prevented from rotating past the retained position to secure the exterior handle in the stowed position, and upon rotation of the visual indicator in a second rotational direction about the axis, opposite the first rotational direction, the exterior handle is movable to an unstowed position, wherein the latch latches the exterior handle into the stowed position.

5. The escape hatch of claim 1, wherein the visual indicator is rotatably connected to the door body.

6. The escape hatch of claim 1, wherein the exterior handle is rotatably connected to the door body.

7. An aircraft comprising the escape hatch of claim 1.

8. A door fora n aircraft, comprising:
    a door body having an exterior side and an interior side opposite the exterior side;
    an exterior handle movably connected to the door body, the exterior handle rotatable between a stowed position, in which the exterior handle is recessed within an opening of the door body, and an unstowed position, the exterior handle being accessible from the exterior side ofthe door body to open the door;
    a hook connected to the door body and selectively moveable between a retained position and an unretained position, the retained position to secure the exterior handle in the stowed position; and
    a visual indicator mechanically coupled to the hook,
    wherein the door body defines an aperture through which the visual indicator is visible from the interior side of the door body only when the hook is in the retained position;
    and wherein any component of the visual indicator is not visible from the interior side of the door body when the hook is in the unretained position; and
    wherein the hook is rotatably connected to the door body; and
    wherein the door further comprises a biasing member biasing the hook to rotate the hook in a first rotational direction, about an axis, past the retained position, and when the exterior handle is in the stowed position, a latch is prevented from rotating past the retained position to secure the exterior handle in the stowed position, and upon rotation of the hook in a second rotational direction about the axis, opposite the first rotational direction, the exterior handle is movable to an unstowed position, wherein the latch latches the exterior handle into the stowed position.

9. The door of claim 8, wherein the hook is biased toward the retained position.

10. The door of claim 8, wherein the visual indicator is rotatably fixed to the hook.

11. The door of claim 8, wherein the exterior handle is rotatably connected to the door body.

12. An aircraft comprising the door of claim 8.

* * * * *